(12) United States Patent
Junginger et al.

(10) Patent No.: US 12,098,746 B2
(45) Date of Patent: Sep. 24, 2024

(54) ROLLING ELEMENT BEARING, MORE PARTICULARLY SLEW RING

(71) Applicant: Schaeffler Technologies AG & Co. KG, Herzogenaurach (DE)

(72) Inventors: Uwe Junginger, Hersbruck (DE); Meik Kreuzer, Bad Kissingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 101 days.

(21) Appl. No.: 17/916,615

(22) PCT Filed: Jan. 29, 2021

(86) PCT No.: PCT/DE2021/100085
§ 371 (c)(1),
(2) Date: Oct. 3, 2022

(87) PCT Pub. No.: WO2021/197528
PCT Pub. Date: Oct. 7, 2021

(65) Prior Publication Data
US 2023/0151849 A1    May 18, 2023

(30) Foreign Application Priority Data
Apr. 2, 2020   (DE) .......................... 102020109150.8

(51) Int. Cl.
*F16C 19/38*   (2006.01)
*F16C 41/00*   (2006.01)

(52) U.S. Cl.
CPC ............ *F16C 19/38* (2013.01); *F16C 41/001* (2013.01); *F16C 19/386* (2013.01)

(58) Field of Classification Search
CPC ...... F16C 19/38; F16C 19/385; F16C 19/386; F16C 41/001; F16C 2316/10
See application file for complete search history.

(56) References Cited

U.S. PATENT DOCUMENTS 8,371,760 B2 *   2/2013   Stolzle ................... F16C 19/38
                                               384/618
9,719,560 B2 *   8/2017   Dreizler ................ F16C 33/585

FOREIGN PATENT DOCUMENTS

| DE | 102006055581 | 5/2008 |
| DE | 102007003970 | 7/2008 |
| DE | 102013207783 | 10/2014 |

(Continued)

*Primary Examiner* — James Pilkington
(74) *Attorney, Agent, or Firm* — Volpe Koenig

(57) ABSTRACT

A rolling element bearing having inner and outer bearing rings with rolling elements therebetween, and an angle-of-rotation limiting device that limits the relative rotation between the inner and outer bearing rings within an angle-of-rotation range from 0° to greater than 360° and includes a first stop element arranged on the inner bearing ring and a second stop element arranged on the outer bearing ring. The first stop element is formed by a plurality of individual radial base bores arranged in peripheral succession in a row on the outer lateral surface of the inner bearing ring and by a slotted-hole-type radial base groove arranged between first and last radial base bores, and one or two separate angle limiters protruding radially beyond the radial base bores or groove can be inserted into the radial base bores or the radial base groove depending on the size of the angle of rotation to be limited.

7 Claims, 4 Drawing Sheets

(56) References Cited

FOREIGN PATENT DOCUMENTS

| | | |
|---|---|---|
| EP | 1925830 B1 | 5/2008 |
| JP | H0320114 | 1/1991 |

* cited by examiner

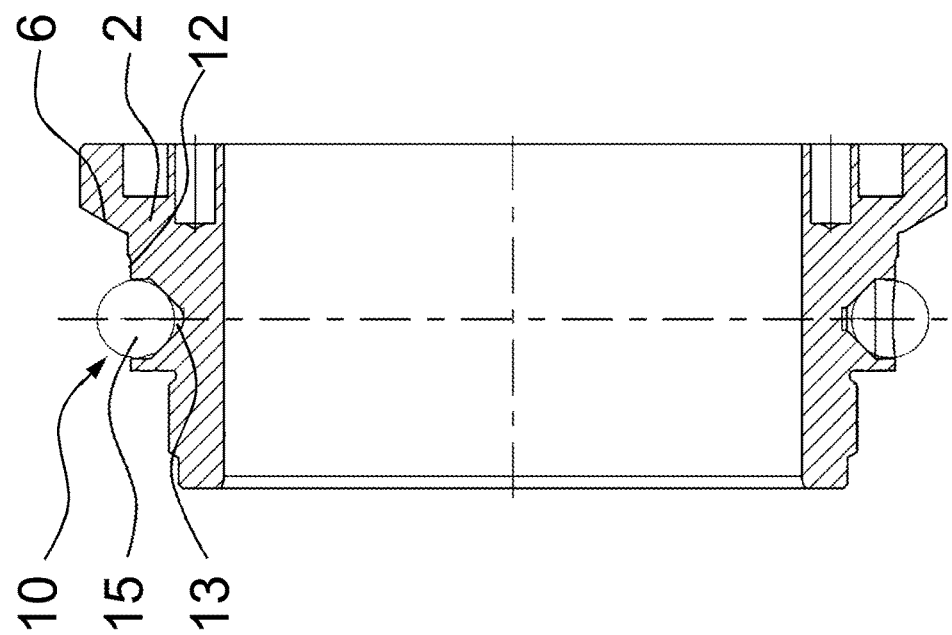
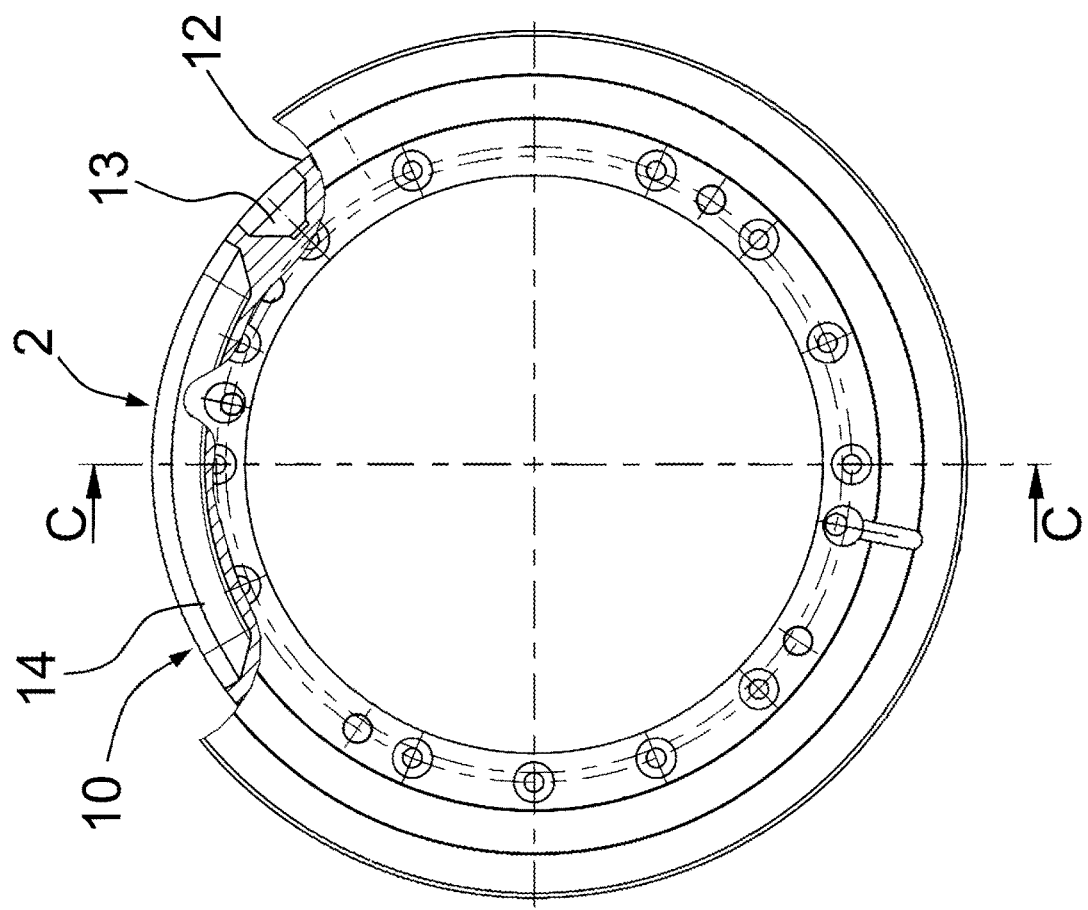
Fig. 3
Fig. 4

ROLLING ELEMENT BEARING, MORE PARTICULARLY SLEW RING

CROSS-REFERENCE TO RELATED APPLICATIONS

This application is the U.S. National Phase of PCT Appln. No. PCT/DE2021/100085, filed Jan. 29, 2021, which claims the benefit of German Patent Appln. No. 10 2020 109 150.8, filed Apr. 2, 2020, the entire disclosures of which are incorporated by reference herein.

TECHNICAL FIELD

The disclosure relates to a rolling element bearing, which is particularly advantageous for use as a slew ring on ceiling pendants in the medical field.

BACKGROUND

Ceiling pendants, such as ceiling supply units, monitor supports, so-called spring arms or central axes in an operating theater or intensive care unit, usually have one or more supports that are rigidly arranged or height-adjustable with respect to a vertical position, by means of which a medical device attached thereto can be moved and positioned. Supply units are often mounted on the ceiling pendants, using which medical-electrical end devices can be supplied with the media required during an operation, for example. In this regard, the supports define a radius of action of the medical device in which the medical device is positioned. The supports can usually be rotated around at least one slew ring, in particular a rolling element bearing. Optionally, the supports are also height-adjustable and/or arranged such that they can be pivoted in height about an at least approximately horizontally aligned axis. A rotational movement of individual supports, be it an absolute rotational movement or a rotational movement relative to another support, should in many cases be limited to a given angle. This can prevent, for example, one support from being rotated by more than a maximum permissible angle with respect to another support, thereby twisting, crushing or even tearing off cables routed inside the support. A limitation of the angle of rotation can be provided, for example, in the form of a stop against which a support strikes at a certain angle of rotation. Although such a limitation of the angle of rotation can ensure that a maximum angle of rotation is not exceeded, in most designs this also has the disadvantage that only a maximum angle of rotation of 360° can be realized, thus limiting the freedom of movement of the ceiling pendant. If an angle of rotation of about 400° is to be realized, the ceiling pendant has to be rotated back from a 360° position over an angle of rotation of 320° with great effort.

A rolling element bearing suitable for use in a ceiling pendant as a slew ring with a stop means for limiting the angle of rotation beyond 360° is known, for example, from DE 10 2006 055 581 A1. This rolling element bearing consists of an inner bearing ring, an outer bearing ring and a plurality of rolling elements, which roll between the bearing rings on inner and outer raceways, wherein an angle-of-rotation limiting device is arranged within the rolling element bearing, which limits the relative rotation between the inner bearing ring and the outer bearing ring within an angle-of-rotation range from 0° to >360° and comprises a first stop element arranged on the inner bearing ring and a second stop element arranged on the outer bearing ring. The angle-of-rotation limiting device is designed as a cam control, which is formed by a spiral-shaped control groove arranged in a side surface of the outer bearing ring as a first stop element and a stop pin axially movable in a slotted groove in a side surface of the inner bearing ring as a second stop element.

Another slew ring with a stop means for limiting the angle of rotation beyond 360° is known from DE 10 2007 003 970 A1. In this slew ring formed by a double-row angular contact roller bearing, the bearing outer ring is provided on its inner lateral surface with a circumferentially extending clearance, which is delimited at its two ends by a first stop lug. The bearing inner ring is provided on its outer lateral surface with a guide groove extending in the circumferential direction, which is delimited at its two ends by a second stop lug, wherein a guide element is arranged in the guide groove which connects the two bearing rings to one another in a form-fitting manner. The possible angle of rotation is thus composed of an addition of the angular range of the clearance in the bearing outer ring with the angular range of the guide groove in the bearing inner ring, so that this can reach a maximum of 720° minus the circumferential expansion of both stop lugs.

Finally, DE 10 2013 207 783 A1 discloses a slew ring with a stop means for limiting the angle of rotation beyond 360°, which is also designed as an angular contact roller bearing with two rows of rolling elements arranged in an O arrangement relative to one another and in which the stop elements of the angle-of-rotation limiting device are each arranged axially between the inner and outer raceways of the bearing rings. The stop elements of the angle-of-rotation limiting device are formed by a spiral-shaped raceway with one or two stops that can be screwed into the raceway and by a lug that projects into the raceway between the stops. Since the spiral design of the raceway eliminates the restrictions that apply to purely circular raceways, it is also possible to realize angles of rotation of more than 360°.

However, a disadvantage of the above-mentioned known slew rings is that the angle-of-rotation limiting devices for realizing angles of rotation greater than 360° are usually very costly to manufacture and/or require more installation space, which causes a further increase in manufacturing costs.

SUMMARY

Due to the disadvantages of the solutions of the known prior art, the disclosure is therefore based on the object of designing a rolling element bearing, in particular a slew ring, in which a limitation of the angle of rotation greater than 360° is possible by simple and space-saving means while at the same time keeping manufacturing costs low.

According to the disclosure, this object is achieved with a rolling element bearing having a first stop element of the angle-of-rotation limiting device, which first stop element is arranged on the inner bearing ring, is formed by a plurality of individual radial base bores arranged in peripheral succession in a row on the outer lateral surface of the inner bearing ring and by at least one slotted-hole-type radial base groove arranged between a first radial base bore and a last radial base bore, and that one or two separate angle limiters protruding radially beyond the radial base bores or the radial base groove can be inserted into the radial base bores or the radial base groove depending on the size of the angle of rotation to be limited and that the second stop element of the angle-of-rotation limiting device, which second stop element is arranged on the outer bearing ring, is formed by a pivoting finger, which is fastened to the inner lateral surface of the outer bearing ring, extends to the radial base bores or the radial base groove in the inner bearing ring and is in stop connection with the angle limiters inserted into the radial base bores or into the radial base groove.

Preferred embodiments and advantageous further developments of the rolling element bearing according to the disclosure are described below and in the claims.

According to one aspect, the rolling element bearing according to the disclosure is preferably designed as an angular contact roller bearing with two rows of rolling elements arranged in an O arrangement relative to one another, and the stop elements of the angle-of-rotation limiting device are each arranged axially centrally between the inner and outer raceways, respectively, of the bearing rings. Needle rollers, cylindrical rollers or tapered rollers have proved particularly suitable as rolling elements for the rolling element bearing. However, it would also be conceivable to design the rolling element bearing as a double-row angular contact ball bearing in an O or X arrangement. It is also conceivable for the stop elements of the angle-of-rotation limiting device to be arranged axially off-center between or on one side next to the raceways of the bearing rings.

According to another aspect, it is a further feature of the rolling element bearing designed that the angle limiters that can be inserted into the radial base bores or the radial base groove in the inner bearing ring are formed by one or two bearing balls corresponding to the diameter or the width of the radial base bores or the radial base groove. However, it is also possible to use one or two cylindrical rollers corresponding to the diameter or width of the radial base bores or the radial base groove as angle limiters, which are inserted into the radial base bores or the radial base groove with one of their end faces first.

According to another aspect, the rolling element bearing is further characterized in that the pivoting finger fastened to the inner lateral surface of the outer bearing ring and extending to the radial base bores or the radial base groove is formed by a threaded pin screwed into a continuous threaded bore in the outer bearing ring. Alternatively, a dowel pin pressed into a through hole can be used as a pivoting finger. In this regard, the threaded pin is screwed in or the dowel pin is pressed in in such a manner that the pivoting finger protrudes beyond the inner lateral surface of the outer bearing ring only to the extent that it does not touch the outer lateral surface of the inner ring at the level of the radial base bores or the radial base groove.

According to another aspect, a further feature of the rolling element bearing is that the radial base bores arranged in peripheral succession in a row on the inner bearing ring enable limitation of the angle of rotation in a range of up to 320° and the radial base groove arranged between the first radial base bore and the last radial base bore is provided for limitation of the angle of rotation in a range of up to 400°. However, if more or fewer radial base bores are arranged in succession and/or the length of the radial base groove is varied, smaller or larger ranges of the angle of rotation limitation are also possible.

Finally, the rolling element bearing according to the disclosure is further characterized in that, for limiting the angle of rotation in a range of up to 340°, two angle limiters are inserted in two correspondingly spaced apart radial base bores or in a radial base bore and in the radial base groove, and the pivoting finger is movable between the one side of the one angle limiter and the other side of the other angle limiter. For limiting the angle of rotation in a range between 350° and 400°, on the other hand, only a single angle limiter is inserted in one of the radial base bores or in the radial base groove, such that the pivoting finger is movable between one side and the other of the one angle limiter. In this regard, an angle limiter inserted in the radial base groove is displaced by the pivoting finger from one end of the radial base groove to its other end.

The rolling element bearing according to the disclosure thus provides the advantage over the rolling element bearings for a slew ring known from the prior art that it is formed by a plurality of individual radial base bores arranged in peripheral succession in a row on the outer lateral surface of the inner bearing ring and by at least one slotted-hole-type radial base groove arranged between a first radial base bore and a last radial base bore as well as by a pivoting finger fastened to the inner lateral surface of the outer bearing ring and extending to the radial base bores or to the radial base groove in the inner bearing ring with a device for limiting the angle of rotation greater than 360°, which consists of simple and space-saving means and can be manufactured at low cost.

BRIEF DESCRIPTION OF THE DRAWINGS

A preferred embodiment of the rolling element bearing designed according to the disclosure is explained in more detail below with reference to the accompanying drawings. In the figures:

FIG. 3 shows a side view of the inner ring of the rolling element bearing according to the disclosure according to FIG. 1;

FIG. 4 shows the cross-section C-C through the inner ring of the rolling element bearing according to the disclosure according to FIG. 3;

DETAILED DESCRIPTION OF THE DRAWINGS

Figure 2:
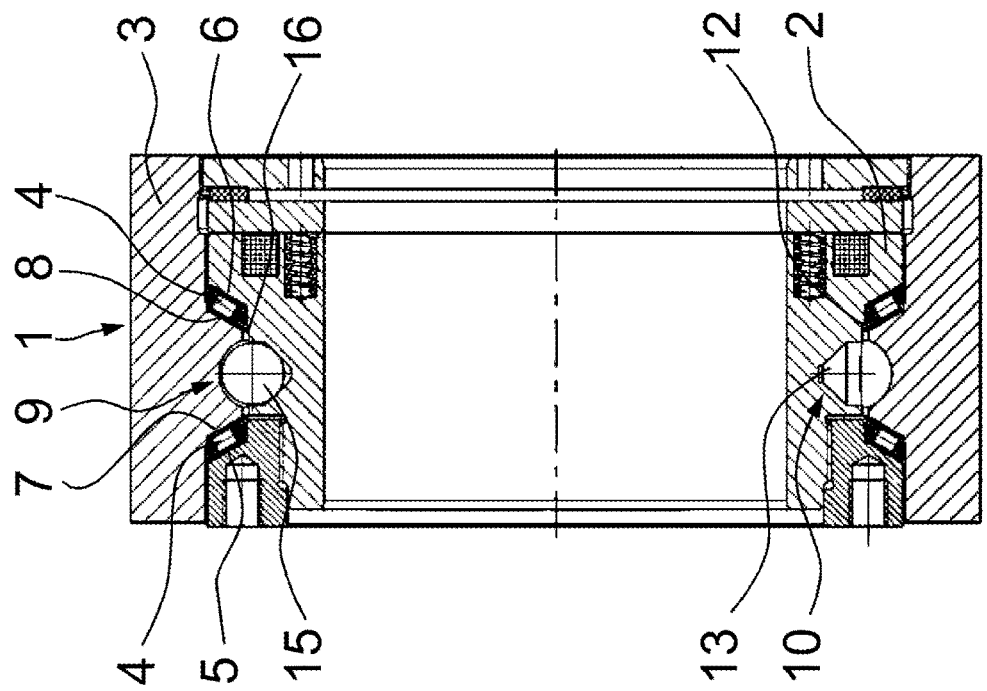
FIG. 2 shows the cross-section A-A through the rolling element bearing according to FIG. 1.
Figure 1:
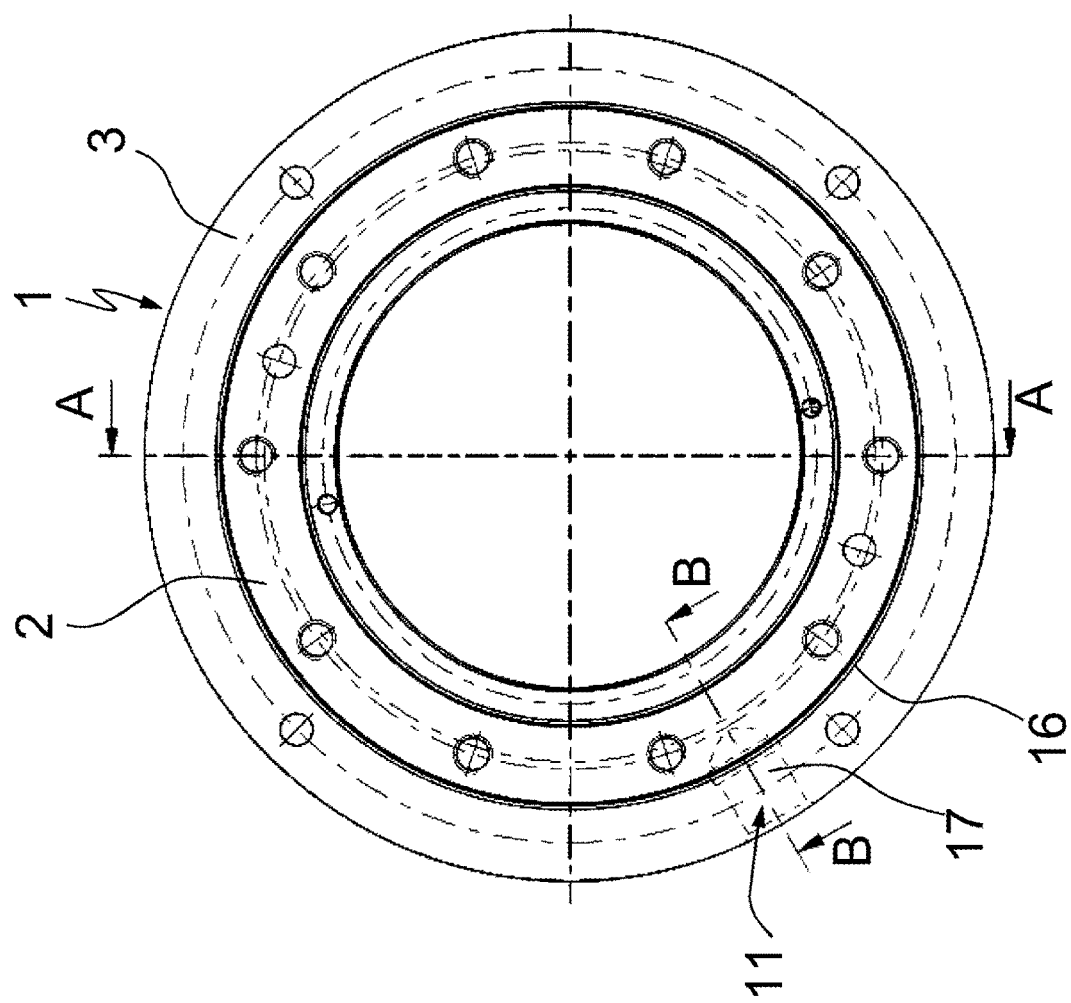
FIG. 1 shows a side view of a rolling element bearing according to the disclosure.

FIGS. 1 and 2 clearly show a rolling element bearing 1 suitable for use as a slew ring in a ceiling pendant, which is designed as an angular contact roller bearing and consists of an inner bearing ring 2, an outer bearing ring 3 and a plurality of rolling elements 4, which are designed as needle rollers arranged in two rows in an O arrangement relative to one another and roll between the bearing rings 2, 3 on inner raceways 5, 6 and outer raceways 7, 8. FIG. 2 also shows that an angle-of-rotation limiting device 9 is arranged within the rolling element bearing 1, which limits the relative rotation of the inner bearing ring 2 with respect to the outer bearing ring 3 within an angle-of-rotation range from 0° to greater than 360°. This angle-of-rotation limiting device 9 comprises a first stop element 10 arranged on the inner bearing ring 2 and a second stop element 11 indicated in FIG. 1 and arranged on the outer bearing ring 3, wherein both stop elements 10, 11 are each arranged axially centrally between the inner raceways 5, 6 and the outer raceways 7, 8, respectively, of the bearing rings 2, 3.

Figure 6:
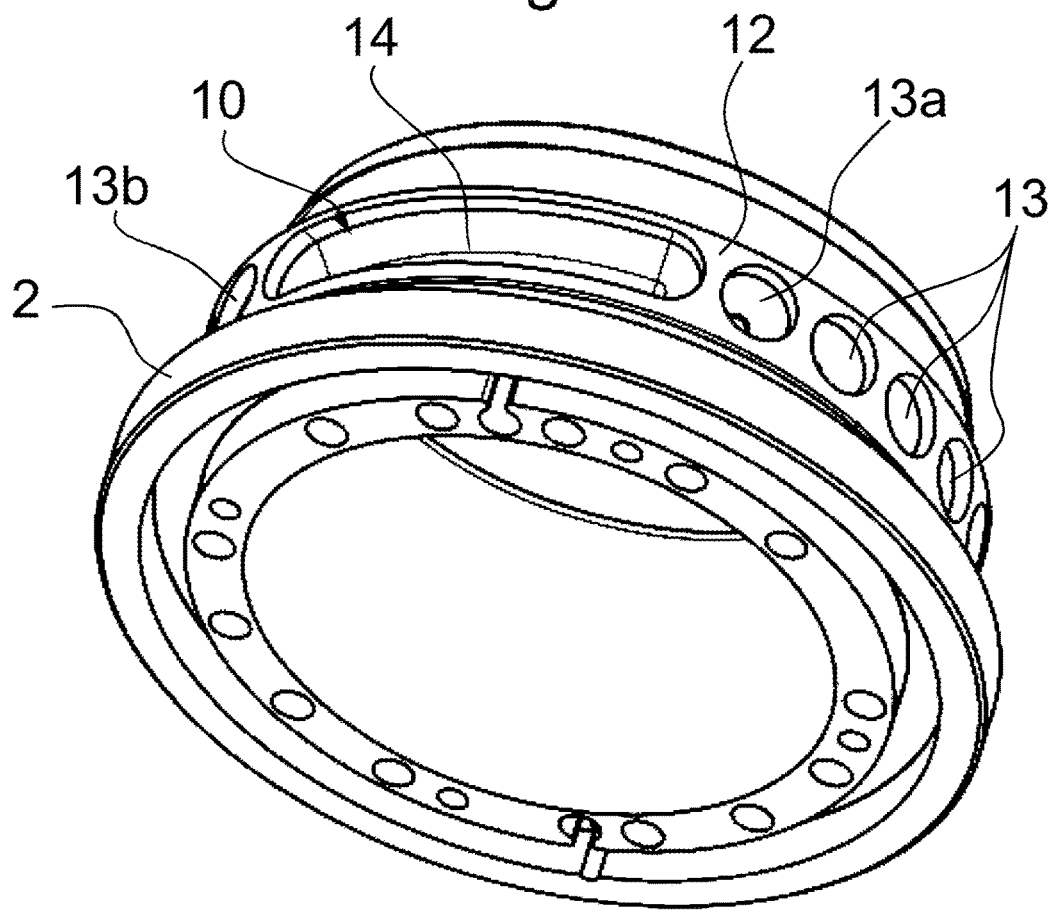
FIG. 6 shows a perspective view of the inner ring of the rolling element bearing according to the disclosure according to FIG. 1.

FIGS. 3, 4 and 6 further show that the first stop element 10 of the angle-of-rotation limiting device 9 arranged on the inner bearing ring 2 is formed by a plurality of individual radial base bores 13 arranged in peripheral succession in a row on the outer lateral surface 12 of the inner bearing ring 2 and by a slotted-hole-type radial base groove 14 arranged between a first radial base bore 13a and a last radial base bore 13b, wherein one or two separate angle limiters 15 protruding radially beyond the radial base bores 13 or the radial base groove 14 can be inserted into the radial base bores 13 or the radial base groove 14 depending on the size of the angle of rotation to be limited. The angle limiters 15 are clearly formed by one or two bearing balls whose diameter corresponds to the diameter of the radial base bores 13 or the width of the radial base groove 14, respectively.

Figure 5:
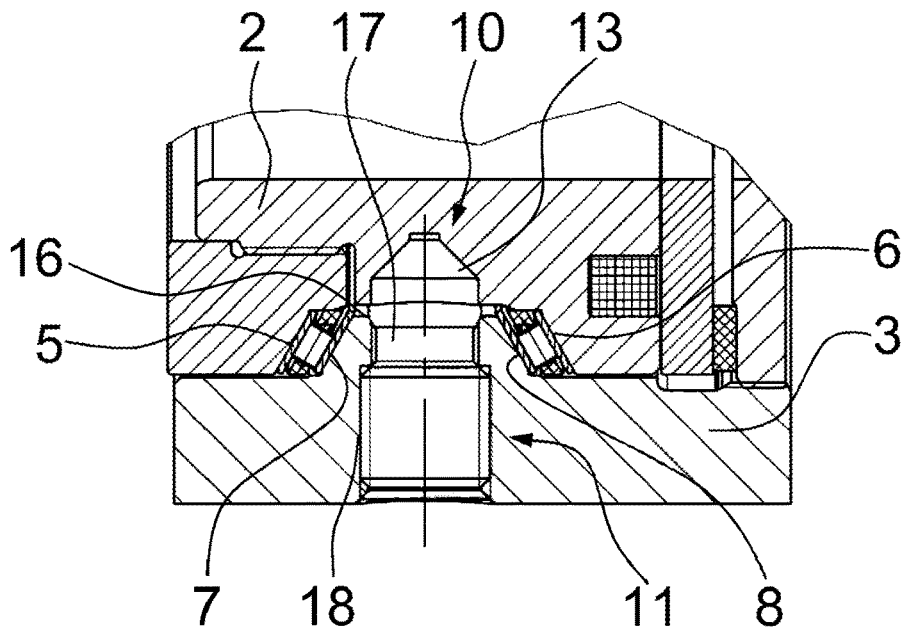
FIG. 5 shows the partial section B-B through the rolling element bearing according to FIG. 1.

The second stop element 11 of the angle-of-rotation limiting device 9, which is arranged on the outer bearing ring 3, is formed on the opposite side by a pivoting finger 17, which is visible in the sectional view in FIG. 5, fastened to the inner lateral surface 16 of the outer bearing ring 3, which is formed by a threaded pin screwed into a continuous threaded bore 18 in the outer bearing ring 3. This pivoting finger 17 clearly extends to the radial base bores 13 or the radial base groove 14 in the inner bearing ring 2 and is in stop connection with the angle limiters 15 inserted in the radial base bores 13 or the radial base groove 14.

Figure 7:
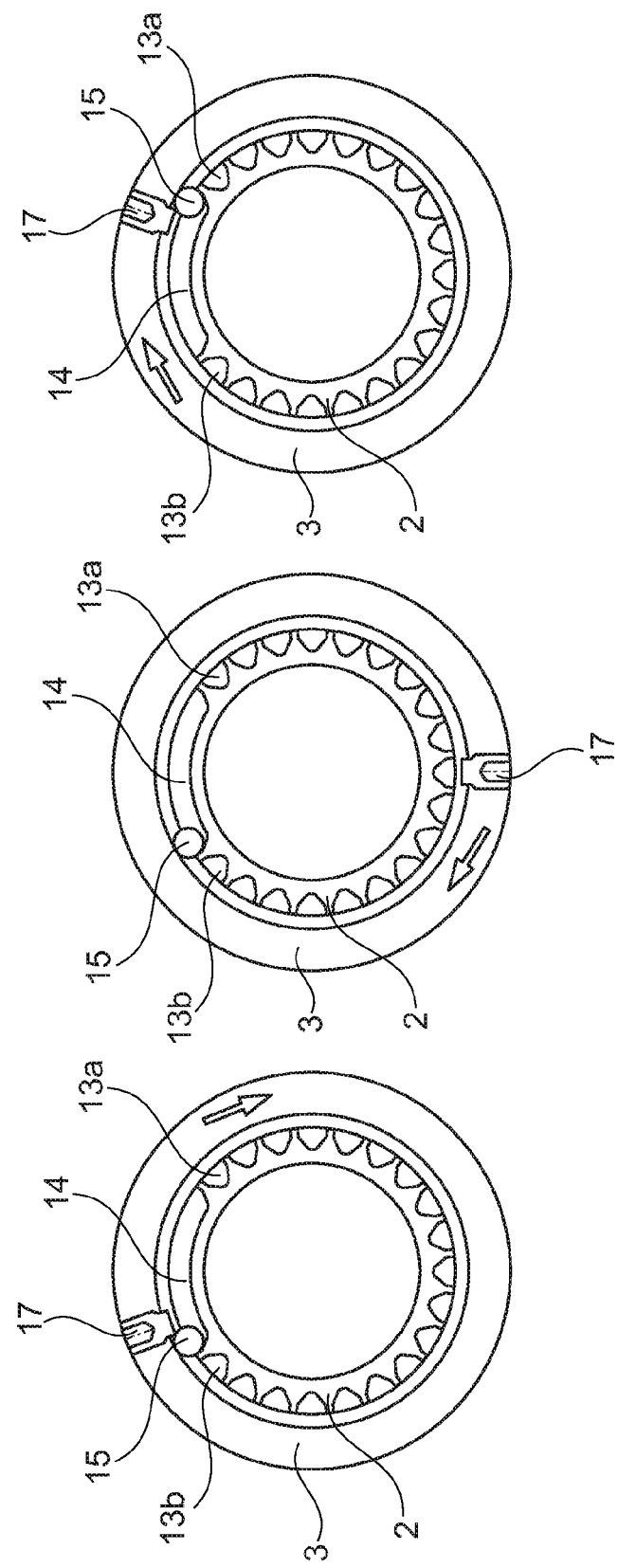
FIG. 7 shows a schematic cross-sectional view of the rolling element bearing according to FIG. 1 in an initial position, a middle position and an end position of the outer bearing ring when the angle of rotation is adjusted by 400°.

FIGS. 6 and 7 also show that the radial base bores 13 arranged in peripheral succession in a row on the inner bearing ring 2 enable limitation of the angle of rotation in a range of up to 320° and that the radial base groove 14 arranged between the first radial base bore 13a and the last radial base bore 13b is provided for limitation of the angle of rotation in a range of up to 400°. For limiting the angle of rotation in a range of up to 340°, two angle limiters 15 are inserted in two correspondingly spaced apart radial base bores 13 or in a radial base bore 13 and in the radial base groove 14 so that the pivoting finger 17 is movable between the one side of the one angle limiter 15 and the other side of the other angle limiter 15. For limiting the angle of rotation in a range between 350° and 400°, on the other hand, only a single angle limiter 15 is inserted in one of the radial base bores 13 or in the radial base groove 14, such that the pivoting finger 17 is movable between one side and the other of the one angle limiter 15.

Finally, the schematic cross-sectional illustrations of the rolling element bearing 1 in FIG. 7 show by way of example the movement of the pivoting finger 17 of the angle-of-rotation limiting device 9 or of the outer bearing ring 2, respectively, when the angle of rotation is adjusted by 400°. The left illustration shows the initial position of the rolling element bearing 1, in which a single bearing ball is inserted as an angle limiter 15 in the radial base groove 14 in the stationary inner bearing ring 2 in such a manner that it rests against the left end of the radial base groove 14 and the pivoting finger 17, which is designed as a threaded pin, on the outer bearing ring 2 is in contact with the right side of the angle limiter 15 in an 11 o'clock position.

After a clockwise rotation of the outer bearing ring 3 by approx. 200°, the pivoting finger 17 on the outer bearing ring 3 is in a middle position corresponding to the middle illustration of FIG. 7, which approximately corresponds to a 6 o'clock position.

With further rotation of the outer bearing ring 3, the pivoting finger 17 then strikes the left side of the angle limiter 15 in the radial base groove 14 at an angle of rotation of about 350° and displaces it within the radial base groove 14 by a further 50° from its left end to its right end to the end position shown in the right illustration of FIG. 7, in which the rotational movement of the outer bearing ring 3 relative to the inner bearing ring is stopped at a total angle of rotation of 400° or in a 1 o'clock position, respectively.

LIST OF REFERENCE SYMBOLS

1 Rolling element bearing
2 Inner bearing ring
3 Outer bearing ring
4 Rolling elements
5 Inner raceway on 2
6 Inner raceway on 2
7 Outer raceway on 3
8 Outer raceway on 3
9 Angle-of-rotation limiting device
10 First stop element
11 Second stop element
12 Outer lateral surface of 2
13 Radial base bores
13a First radial base bore
13b Last radial base bore
14 Radial base groove
15 Angle limiter
16 Inner lateral surface of 3
17 Pivoting finger

The invention claimed is:

1. A rolling element bearing, comprising:
an inner bearing ring including at least one inner raceway;
an outer bearing ring including at least one outer raceway;
a plurality of rolling elements, which roll between the inner bearing ring and the outer bearing ring on the at least one inner raceway and the at least one outer raceway;
an angle-of-rotation limiting device which limits a relative rotation between the inner bearing ring and the outer bearing ring within an angle-of-rotation range from 0° to greater than 360°, the angle-of-rotation limiting device including:
a first stop element arranged on the inner bearing ring;
a second stop element arranged on the outer bearing;
the first stop element is formed by a plurality of individual radial base bores arranged in peripheral succession in a row on an outer lateral surface of the inner bearing ring and by at least one radial base groove arranged between a first one of the radial base bores and a last one of the radial base bores;
one or two separate angle limiters protrude radially beyond the radial base bores or the radial base groove and are insertable into the radial base bores or the radial base groove depending on a size of the angle of rotation to be limited; and
the second stop element comprises a finger, which is fastened to an inner lateral surface of the outer bearing ring, the finger extends toward the radial base bores or the radial base groove in the inner bearing ring, and the finger is in stop connection with the one or two separate angle limiters inserted into the radial base bores or into the radial base groove, such that the finger contacts an angle limiter to prevent relative movement between the inner bearing ring and the outer bearing ring beyond the angle-of-rotation range.

2. The rolling element bearing according to claim 1, wherein the rolling element bearing is an angular contact roller bearing with two rows of the rolling elements arranged in an O-arrangement, and the stop elements of the angle-of-rotation limiting device are each arranged axially centrally between a first inner raceway and a second inner raceway of the inner bearing ring and between a first outer raceway and a second outer raceway of the outer bearing ring.

3. The rolling element bearing according to claim 2, wherein the one or two separate angle limiters that are insertable into the radial base bores or the radial base groove in the inner bearing ring are each formed by a bearing ball corresponding to a diameter or a width of the radial base bores or the radial base groove.

4. The rolling element bearing according to claim 3, wherein the finger fastened to the inner lateral surface of the outer bearing ring and extending toward the radial base bores or the radial base groove is formed by a threaded pin screwed into a continuous threaded bore in the outer bearing ring.

5. The rolling element bearing according to claim 4, wherein an angle limiter inserted in the first radial base bore and another angle limiter inserted into the last radial base bore to limit the angle of rotation in a range of up to 320°.

6. The rolling element bearing according to claim 4, wherein two angle limiters are inserted in two correspondingly spaced apart ones of the radial base bores or in one said radial base bore and in the radial base groove, and the finger is movable between a first one of the angle limiters and a second one of the angle limiters to limit the angle of rotation to a range of up to 340°.

7. The rolling element bearing according to claim 4, wherein only a single one of the angle limiters is inserted in one of the radial base bores or in the radial base groove, and the finger is movable between one end and an other end of the single angle limiters, and the angle limiter inserted into the radial base groove is displaceable by the finger from one end of the radial base groove to an other end thereof to limit the angle of rotation in a range of between 350° and 400°.

\* \* \* \* \*